United States Patent [19]

Jan

[11] Patent Number: 4,775,164

[45] Date of Patent: Oct. 4, 1988

[54] STANDS

[76] Inventor: Cow M. Jan, No. 39-3, Aelly 350, Li Zen Rd., Tainan, Taiwan

[21] Appl. No.: 152,676

[22] Filed: Feb. 5, 1988

[51] Int. Cl.$^4$ .............................................. B62H 1/02
[52] U.S. Cl. ................................ 280/303; 280/763.1; 254/133 R
[58] Field of Search .............. 280/302, 303, 301, 295, 280/43.24, 761, 763.1, 767, 300, 293; 254/133 R, 131; 248/129, 130, 143

[56] References Cited

U.S. PATENT DOCUMENTS 3,658,360  4/1972  Wood .................................. 280/302
4,671,374  6/1987  Kouyama et al. .............. 280/303 X

FOREIGN PATENT DOCUMENTS 540387  10/1941  United Kingdom ............... 280/303

Primary Examiner—David M. Mitchell
Assistant Examiner—Tamara L. Finlay
Attorney, Agent, or Firm—Morton J. Rosenberg

[57] ABSTRACT

An improved stand comprises a substantially "H" shaped supporting frame which was pivoted with an also substantially "H" shaped shifting frame. There are rollers provided on the lower end of the shifting frame and properly exceeding the lower end of the supporting frame when the shifting frame is at positions close to the supporting frame, thus we can force the shifting frame to rotate toward the parked supporting frame to temporarily take over the support of the supporting frame, and adjust the position of the parked motorcycle or motor-bike easily within a narrow area.

1 Claim, 3 Drawing Sheets

STANDS

BACKGROUND OF THE INVENTION

This invention relates to a stand, particularly to a stand of motorcycle or motor-bike.

Motorcycles or motor-bikes are popular traffic means in the developing countries as they are economical in fuel consumption and saving in spaces. When parking a motorcycle or motor-bike, one of the two wheels, mostly the front wheel, is suspended by a stand which generally has two spaced legs assembled at the bottom or the lower part of the body of the motorcycle or motor-bike to be turned to maintain a stable stand of the body of the motorcycle or motor-bike.

It was found difficult to slightly adjust the position of a motorcycle or motor-bike to fit a parking block or to find a way out when it is parked among crowed motorcycles and motor-bikes.

SUMMARY OF THE INVENTION

It is accordingly a primary object of this invention to provide an improved stand with an available function of shifting a parked motorcycle or motor-bike without repositioning the stand.

According to the present invention, this and other objects are achieved by providing a stand, which comprises a substantially "H" shaped supporting frame pivoted with an also substantially "H" shaped shifting frame. A pair of seats are mounted on the lower end of the shifting frame, having rollers extending beyond the lower end of the supporting frame when the shifting frame is at the positions close to the supporting frame.

Said shifting frame can be forced to rotate toward the parked supporting frame to temporarily take over the support of the supporting frame, thus the position of a parked motorcycle or motor-bike can be easily adjusted within a narrow area with said rollers of the shifting frame.

DETAILED DESCRIPTION OF THE PREFERRED EMBODIMENT

Figure 1:
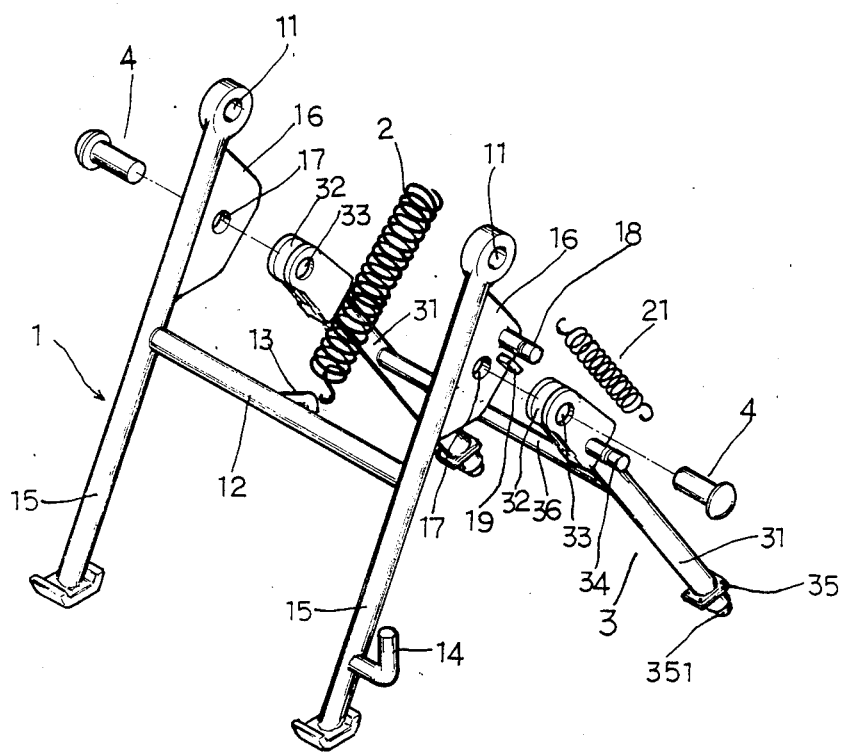
FIG. 1 is an explode and perspective view of a stand embodying the present invention.
Figure 2:
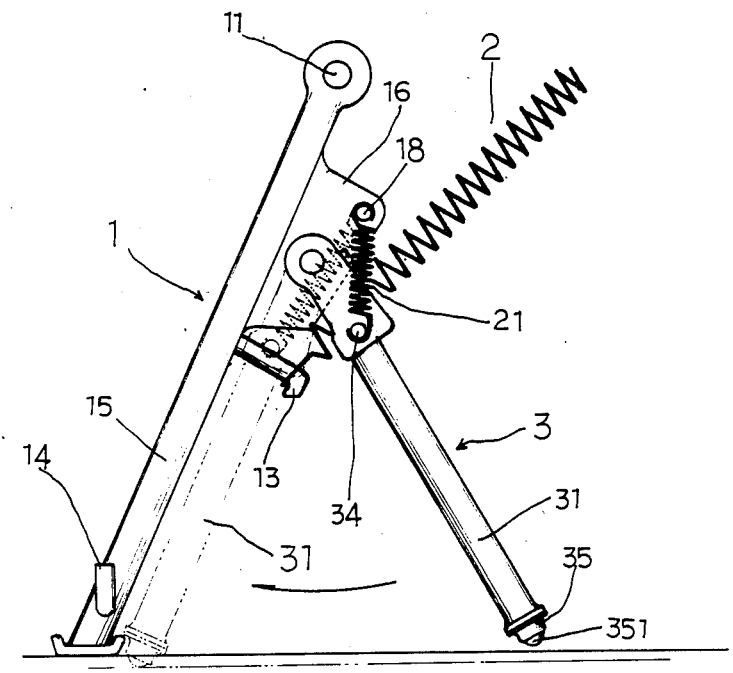
FIG. 2 is a side elevation view of a stand embodying the present invention.

Referring to FIGS. 1 and 2, the stand according to the present invention includes a substantially "H" shaped supporting frame 1, an also substantially "H" shaped shifting frame 3, and necessary springs 2 and 21, etc.

The supporting frame 1 has a pair of swivel holes 11 formed on the top ends of its two parallel legs 15. A connecting rod 12 having a spring hook 13 properly fixed for receiving one end of a spring 2 is horizontally arranged between said legs 15. A step unit 14 is laterally welded on one of the legs 15 for controlling the supporting frame 1 with foot, and a pair of supporting plates 16 are correspondingly mounted on the upper parts of said two legs 15, having holes 17 formed in each of the plates.

A bar 18 is laterally welded on either one of the two supporting plates 16 for receiving one end of a spring 21, and a stop unit 19 is also laterally welded on either one of the two supporting plates for limiting the shifting frame 3.

The shifting frame 3 has a pair of receiving heads 32 mounted on the top end of its two parallel legs 31 for respectively sandwiching the supporting plates 16 of the supporting frame 1, and a connecting rod 36 horizontally arranged between said legs 31. A pair of seats 35 with its rollers 351 are fixed on the other ends of the legs 31. Each of said receiving heads 32 has oppositely formed holes 33 which can be aligned with the holes 17 of the sandwiched supporting plates 16, and further to be pivoted with bolts 344. A bar 34, which is substantially parallel to the bar 18 welded on the supporting frame 1, is laterally welded on one of the legs 31. The pivoted shifting frame 3 can be rotated within a range from the position adjacent to the legs 15 of the supporting frame 1 to the position limited by the stop unit 19. Said rollers 351 of the seats 35 are extending beyond the lower ends of the two legs 15 of the supporting frame 1 when the pivoted shifting frame 3 is at the positions close to the supporting frame 1 (as the dotted lines shows in FIG. 2).

The spring 21 is provided between the bars 18 and 34 for suspending the shifting frame 3 at the position limited by the stop unit 19.

Figure 3:
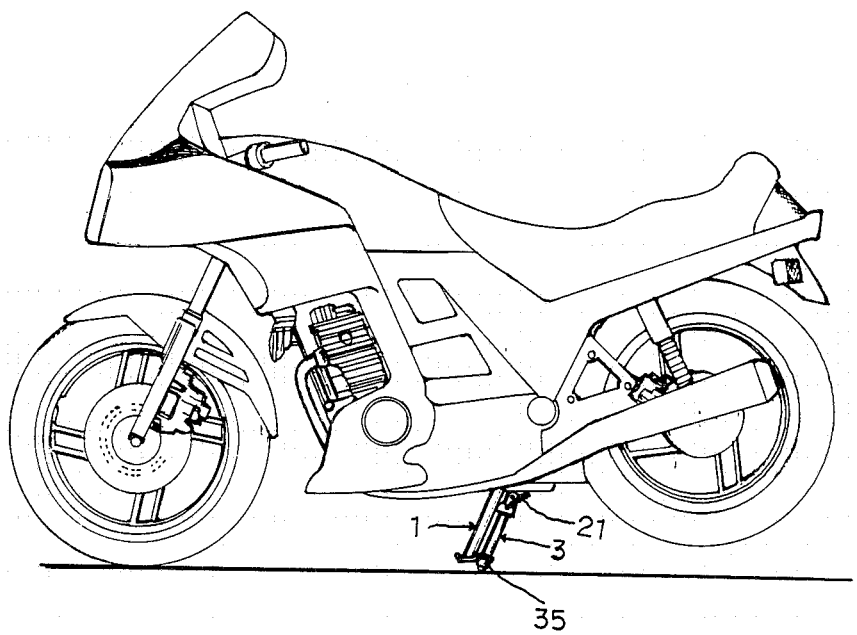
FIG. 3 is a side elevation view of a stand embodying the present invention in cooperation with a motorcycle.

Referring to FIG. 3, the stand of the present invention can be assembled at the bottom or the lower part of the body of a motorcycle or motor-bike as usual, and stably support the motorcycle or motor-bike with the supporting frame 1 of the stand. The shifting frame 3 can be forced with foot to rotate toward the parked supporting frame 1 to temporarily take over the support of the supporting frame 1, thus the position of a parked motorcycle or motor-bike can be easily adjusted within a narrow area with the rollers of the shifting frame 3.

The shifting frame 3 can be pulled back to the suspending position by the spring 21 after the completion of said adjustment, and the motorcycle or motor-bike is once again stably supported by the supporting frame 1.

It will be appreciated, of course, that although a particular embodiment of the invention has been described, modification may be made. It is intended in the following claim to cover all modifications which all within the scope of the invention.

What is claimed is:

1. An improved stand of motorcycle or motor-bike includes:
   a supporting frame having two parallel legs and a connecting rod arranged inbetween;
   means formed on the top ends of said two legs for assembling said supporting frame at the bottom or at the lower part of the body of a motorcycle or motor-bike; a spring hook fixed on said supporting frame for receiving a spring;
   a spring provided between the spring hook and the body for suspending the supporting frame under the body;
   a pair of supporting plates correspondingly mounted on the upper parts of said two legs with holes formed therein;
   a bar laterally welded on either one of the two supporting plates;
   a stop means laterally welded on either one of the two supporting plates;
   a shifting frame having two parallel legs and a connecting rod arranged inbetween;

a pair of receiving heads formed on the top ends of the two legs of the shifting frame for sandwiching the supporting plates of the supporting frame, having holes correspondingly formed therein;

bolts to be inserted through the holes of the supporting frame and the receiving heads for pivoting the supporting frame and the shifting frame;

seat means fixed on the lower ends of the legs of the shifting frame having rollers extending beyond the lower ends of the legs of the supporting frame when the shifting frame is at the position close to the supporting frame;

a bar laterally welded on one leg of the shifting frame which is at the same side of the bar welded on the supporting plates;

a spring provided between the bars welded on the supporting plates and the leg of the shifting frame for suspending the shifting frame at the position limited by the stop means

* * * * *